United States Patent
Ikeda et al.

(10) Patent No.: US 11,094,120 B2
(45) Date of Patent: Aug. 17, 2021

(54) INSPECTION PROCESSING SYSTEM, INSPECTION PROCESSING METHOD, AND INSPECTION PROCESSING PROGRAM

(71) Applicant: OBAYASHI CORPORATION, Tokyo (JP)

(72) Inventors: Yuichi Ikeda, Tokyo (JP); Tamaki Horii, Tokyo (JP); Kazuyuki Goto, Tokyo (JP); Hidefumi Takenaka, Tokyo (JP); Takayuki Yamamoto, Tokyo (JP)

(73) Assignee: OBAYASHI CORPORATION, Tokyo (JP)

( * ) Notice: Subject to any disclaimer, the term of this patent is extended or adjusted under 35 U.S.C. 154(b) by 0 days.

(21) Appl. No.: 16/045,577

(22) Filed: Jul. 25, 2018

(65) Prior Publication Data
US 2019/0035155 A1   Jan. 31, 2019

(30) Foreign Application Priority Data

Jul. 27, 2017 (JP) .............................. JP2017-145423

(51) Int. Cl.
G06T 19/00 (2011.01)
G06T 19/20 (2011.01)
G06T 7/00 (2017.01)

(52) U.S. Cl.
CPC .......... *G06T 19/006* (2013.01); *G06T 7/0004* (2013.01); *G06T 19/20* (2013.01);
(Continued)

(58) Field of Classification Search
None
See application file for complete search history.

(56) References Cited

U.S. PATENT DOCUMENTS 9,984,499 B1 * 5/2018 Jurgenson ............... G06T 17/00
2005/0215879 A1 * 9/2005 Chuanggui ............. G06T 7/001
600/407

(Continued)

FOREIGN PATENT DOCUMENTS

JP   2004-078987 A   3/2004
JP   2010-108384 A   5/2010
(Continued)

OTHER PUBLICATIONS

Vineet R. Kamat, Sherif El-Tawil, "Structure of an Augmented Situational Visualization Framework for Rapid Building Damage Evaluation", 2004, University of Michigan (Year: 2004).*

(Continued)

*Primary Examiner* — YuJang Tswei
(74) *Attorney, Agent, or Firm* — Maschoff Brennan (57) ABSTRACT

An inspection processing system includes a control unit connected to a photographing unit and an output unit. The control unit includes circuitry. The inspection processing system identifies a current position, displays a virtual image of a three-dimensional model of a structure corresponding to the current position. The virtual image is superimposed on a structure image obtained from the photographing unit. The inspection processing system further obtains an evaluation result of an evaluation item of an inspection subject using the structure image on which the displayed virtual image is superimposed, and records the evaluation result in an inspection information memory in association with the position of the inspection subject in the three-dimensional model.

21 Claims, 8 Drawing Sheets

(52) U.S. Cl.
CPC .............. *G06T 2207/10024* (2013.01); *G06T 2207/30132* (2013.01); *G06T 2207/30136* (2013.01); *G06T 2219/2012* (2013.01)

(56) References Cited

U.S. PATENT DOCUMENTS

| | | | |
|---|---|---|---|
| 2008/0247636 A1* | 10/2008 | Davis | G06T 19/00 382/152 |
| 2013/0272569 A1 | 10/2013 | Yumbe et al. | |
| 2015/0317418 A1* | 11/2015 | Sankarapandian | G06F 17/5004 703/1 |
| 2015/0363076 A1 | 12/2015 | Komatsu | |
| 2016/0282230 A1* | 9/2016 | Poser | G06Q 10/06 |
| 2016/0334778 A1 | 11/2016 | Cope | |
| 2017/0132752 A1 | 5/2017 | Aoyagi et al. | |
| 2017/0235848 A1* | 8/2017 | Van Dusen | H04L 41/04 705/12 |
| 2017/0249410 A1* | 8/2017 | Baker | G06F 30/00 |
| 2017/0256083 A1* | 9/2017 | Ikeuchi | G09G 5/377 |
| 2017/0330343 A1* | 11/2017 | Fujita | G06K 9/00335 |
| 2018/0181220 A1 | 6/2018 | Hung | |

FOREIGN PATENT DOCUMENTS

| | | |
|---|---|---|
| JP | 2014-002536 A | 1/2014 |
| JP | 2014-002645 A | 1/2014 |
| JP | 2014-35341 A | 2/2014 |
| JP | 2016-03981 A | 1/2016 |
| JP | 2016-035622 A | 3/2016 |
| JP | 2016-133347 A | 7/2016 |
| JP | 2017-45404 A | 3/2017 |
| JP | 2017-059033 A | 3/2017 |
| JP | 2017-091078 A | 5/2017 |
| KR | 10-2017-0043128 A | 4/2017 |

OTHER PUBLICATIONS

U.S. Office Action in U.S. Appl. No. 16/045,596 dated Jul. 12, 2019.
U.S. Office Action in U.S. Appl. No. 16/045,596 dated Dec. 20, 2019.
U.S. Office Action issued in corresponding U.S. Appl. No. 16/045,596, dated Apr. 17, 2020.
U.S. Office Action issued in corresponding U.S. Appl. No. 16/045,596, dated Apr. 2, 2021.
JP Office Action in Application No. 2017-145423 dated Apr. 20, 2021.
JP Office Action in Application No. 2017-145422 dated Jun. 1, 2021.

* cited by examiner

INSPECTION PROCESSING SYSTEM, INSPECTION PROCESSING METHOD, AND INSPECTION PROCESSING PROGRAM

BACKGROUND

The present disclosure relates to an inspection processing system, an inspection processing method, and an inspection processing program that assist inspection of a structure.

In a site of building, civil engineering, or the like, situations before and after construction working or situations during construction working are photographed to check or inspect the situations in some cases. Japanese Laid-Open Patent Publication No. 2014-35341 discloses a technique for measuring the installment precision of a building element such as a column. In this technique, markers are arranged in advance on multiple predetermined points of the column to be located at a predetermined position. After installation, the markers are photographed with a stereo camera. The positions of the markers are extracted from the photographed images. Then, based on the positions of the markers, installation precision in errors or the like in the actual installation position of the column relative to the designed installation position of the column are computed.

Further, Japanese Laid-Open Patent Publication No. 2016-3981 discloses an assembled rebar inspection system for inspecting assembled rebars. In this technique, if information such as the diameters, number, and pitches of reinforcing bars (rebars) subject to inspection is input, the assembled rebar inspection system measures the diameters, number, pitches, and the like of the rebars subject to inspection based on the photographed images of the rebars subject to inspection. Then, the assembled rebar inspection system determines whether or not the input information of the rebars subject to inspection matches the measurement information of the rebars subject to inspection measured based on the photographed images.

In addition, Japanese Laid-Open Patent Publication No. 2017-45404 discloses an image management system for managing photographed images of a site. In this technique, a control unit of a tablet terminal executes a process for photographing a construction work record. Then, the control unit records the photographed images in association with the current position, generates photographed image information including the current position in relation to the photographed images, and records the photographed image information. If the photographing point is preregistered, the control unit records the coordinates of the point in association with the photographed images and adjusts position information of the photographed images on the photographing point from the previous time to the present time.

Although the technique of Japanese Laid-Open Patent Publication No. 2014-35341 allows for installation precision measurement with a stereo camera, it is not intended for increasing the efficiency of inspection. Further, Japanese Laid-Open Patent Publication No. 2016-3981 is not intended for inspection using images. In addition, the technique of Japanese Laid-Open Patent Publication No. 2017-45404 allows a photographed image to remain on a predetermined point but does not increase the efficiency of inspection. This is because inspection is performed in the same manner as the conventional one.

SUMMARY

It is an object of the present disclosure to efficiently inspect a structure.

To achieve the above object, one aspect of the present disclosure provides an inspection processing system that includes a control unit connected to a photographing unit and an output unit. The control unit includes circuitry. The circuitry is configured to identify a current position and display a virtual image of a three-dimensional model of a structure corresponding to the current position. The virtual image is by superimposed on a structure image obtained from the photographing unit. The circuitry is further configured to obtain an evaluation result of an evaluation item of an inspection subject using the structure image on which the displayed virtual image is superimposed, and record the evaluation result in an inspection information memory in association with the position of the inspection subject in the three-dimensional model.

Another aspect provides a method for assisting inspection using an inspection processing system including a control unit connected to a photographing unit and an output unit. The control unit includes circuitry. The circuitry identifies a current position and displays a virtual image of a three-dimensional model of a structure corresponding to the current position. The virtual image is by superimposed on a structure image obtained from the photographing unit. The circuitry further obtains an evaluation result of an evaluation item of an inspection subject using the structure image on which the displayed virtual image is superimposed, and records the evaluation result in an inspection information memory in association with the position of the inspection subject in the three-dimensional model.

A further aspect provides a non-transitory computer-readable medium that stores a program thereon. The program, when executed by circuitry of a control unit of an inspection processing system connected to a photographing unit and an output unit, causes the circuitry to identify a current position and display a virtual image of a three-dimensional model of a structure corresponding to the current position. The virtual image is superimposed on a structure image obtained from the photographing unit. The program further causes the circuitry to obtain an evaluation result of an evaluation item of an inspection subject using the structure image on which the displayed virtual image is superimposed and record the evaluation result in an inspection information memory in association with the position of the inspection subject in the three-dimensional model.

Other aspects and advantages of the present disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the presently preferred embodiments together with the accompanying drawings in which.

DETAILED DESCRIPTION OF THE PREFERRED EMBODIMENTS

An inspection processing system, an inspection processing method, and an inspection processing program according to one embodiment will now be described with reference to FIGS. 1 to 7E. In the description of the present embodiment, the inspection system assists inspection of a structure (for example, assembled rebars) at a construction work site of building work. In this case, two-dimensional images (virtual images) generated through building information modeling (BIM) and photographed images (structure images) at a site are used to assist inspection and share information about the inspection result among participants.

Figure 1:
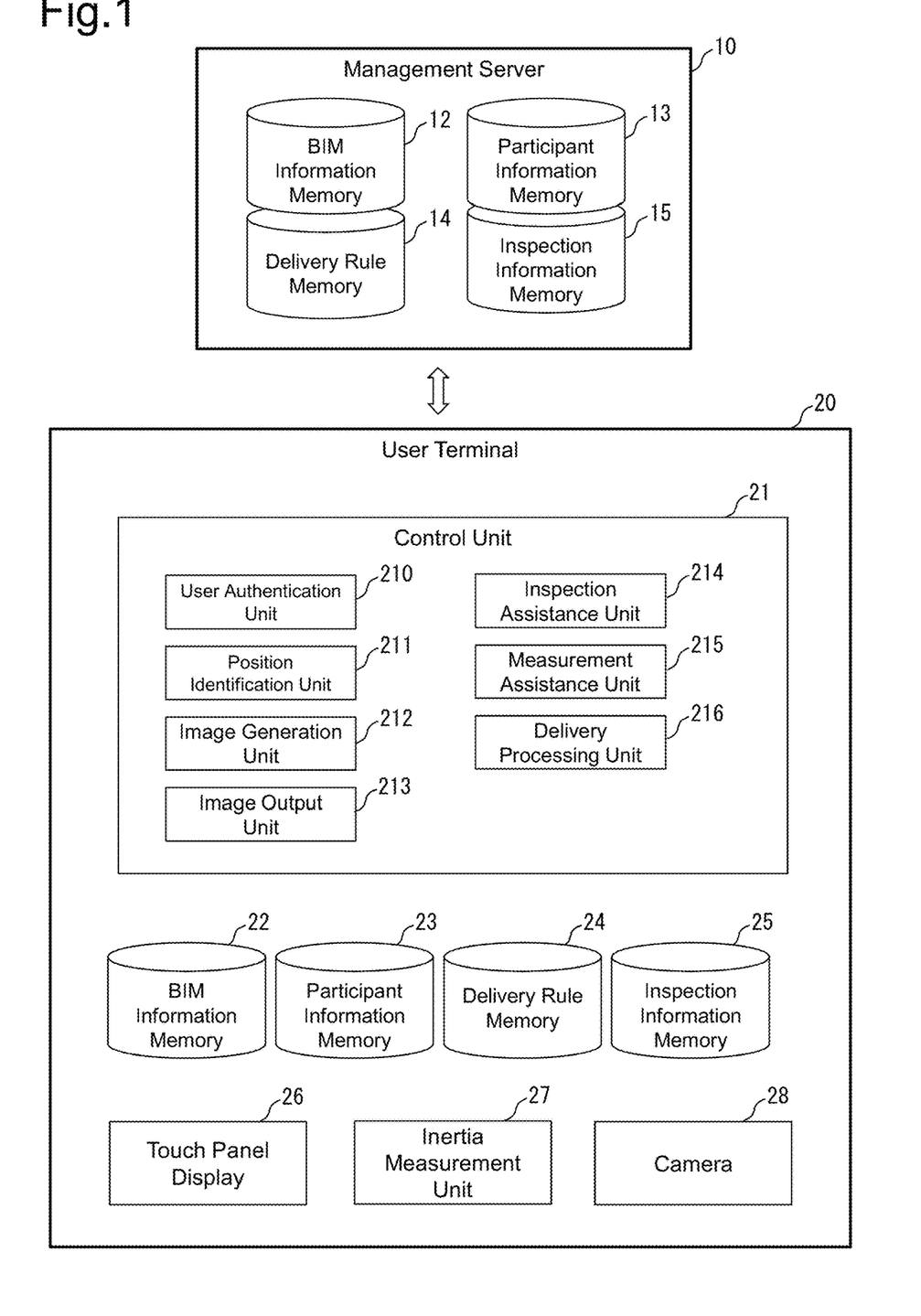
FIG. 1 is a diagram illustrating a system of the present embodiment.

FIG. 1 shows a management server 10 and a user terminal 20 used to perform assembled rebar inspection of a structure.

The management server 10 is a computer system that manages various types of data used at the user terminal 20. The management server 10 includes a BIM information memory 12, a participant information memory 13, a delivery rule memory 14, and an inspection information memory 15. Data recorded in the BIM information memory 12, the participant information memory 13, the delivery rule memory 14, and the inspection information memory 15 are the same as data recorded in a BIM information memory 22, a participant information memory 23, a delivery rule memory 24, and an inspection information memory 25 of the user terminal 20, which will be described later. Thus, each data will be described in the description of the BIM information memory 22, the participant information memory 23, the delivery rule memory 24, and the inspection information memory 25.

The user terminal 20 is a computer terminal that assists inspection of a structure using images photographed at a construction work site. The user terminal 20 includes a control unit 21, the BIM information memory 22, the participant information memory 23, the delivery rule memory 24, the inspection information memory 25, a touch panel display 26, an inertia measurement unit 27, and a camera 28.

The touch panel display 26 functions as an input unit to which various types of information are input, and functions as an output unit that outputs various types of information are output. As long as the input unit and the output unit are hardware to which information can be input and output, the input unit and the output unit are not limited to the touch panel display 26.

The inertia measurement unit 27 functions as a position identification unit that calculates a movement distance or movement direction by obtaining three-axis acceleration.

The camera 28 functions as a photographing unit that photographs an object. In the present embodiment, a stereo camera that simultaneously photographs a subject from different directions to obtain information in a depthwise direction of the directions is used. The distance to an object and point group data for a three-dimensional shape are obtained using the camera 28. As long as the photographing unit is hardware that photographs an object, the photographing unit is not limited to a stereo camera.

The control unit 21 functions as a control means including a CPU, a RAM, a ROM, and the like and performs processes (processes including, for example, user authentication stage, position identification stage, image generation stage, image output stage, inspection assistance stage, measurement assistance stage, and delivery processing stage), which will be described later. By executing an inspection processing program for the processes, the control unit 21 functions as a user authentication unit 210, a position identification unit 211, an image generation unit 212, an image output unit 213, an inspection assistance unit 214, a measurement assistance unit 215, a delivery processing unit 216, and the like.

The user authentication unit 210 executes a process for identifying a user.

The position identification unit 211 executes a process for identifying the current place. In the present embodiment, the inertia measurement unit 27 is used to calculate a movement distance or movement direction. The position identification unit 211 identifies the current place based on the movement distance and the movement direction from the initial position.

The image generation unit 212 executes a process for generating a two-dimensional virtual image from a three-dimensional model. In the present embodiment, a two-dimensional image (BIM image) is generated from a three-dimensional model of a structure recorded in the BIM information memory 22 (described later). The viewpoint of the two-dimensional image corresponds to the case of viewing the photographing direction of the camera 28 from the current position in the virtual space (BIM space).

The image output unit 213 executes a process for displaying a BIM image where the BIM image is superimposed on an image that is photographed by the camera 28 and output to the touch panel display 26.

The inspection assistance unit 214 executes a process for assisting inspection of inspection items recorded in the inspection information memory 25.

The measurement assistance unit 215 executes a process for assisting measurement that is necessary for the inspection items based on a photographed image. The measurement assistance unit 215 assists measurement of, for example, anchorage length, rebar pitch, and rebar diameter.

The delivery processing unit 216 executes a process for delivering an inspection result based on a delivery rule.

Figure 2A:
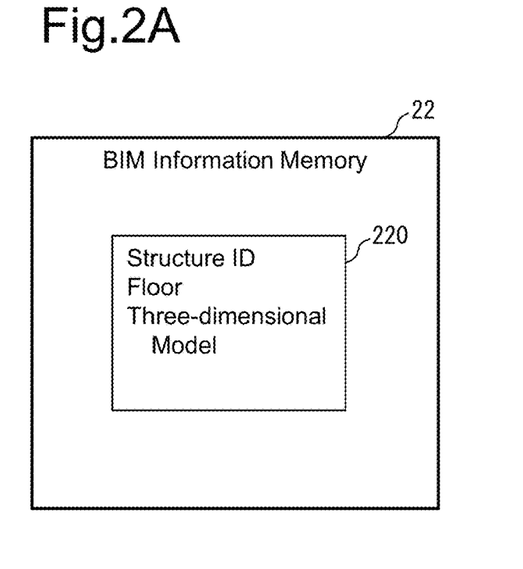
FIGS. 2A to 2D are diagrams illustrating data recorded in a BIM information memory, a participant information memory, a delivery rule memory, and an inspection information memory of the system shown in FIG. 1, respectively.

As shown in FIG. 2A, the BIM information memory 22 (model memory) records BIM management data 220 related to a three-dimensional model of a structure subject to inspection generated through the BIM technique. If a three-dimensional model generated when a structure is designed is downloaded from the management server 10, the BIM management data 220 is recorded. The BIM management data 220 includes data related to a structure ID, floor, and three-dimensional model.

Data related to an identifier that identifies a structure is recorded in a structure ID data region.

Data related to an identifier that identifies a floor of the structure is recorded in a floor data region.

A three-dimensional model arranged in virtual space (BIM space) of the floor is recorded in a three-dimensional model data region. The three-dimensional model includes multiple element models. For example, with regard to assembled rebars, a three-dimensional model of a rebar arranged on the floor (BIM space) is recorded. The coordinates of an initial position marker attached to an inspection start position are recorded in the three-dimensional model.

Each three-dimensional model keeps attribute information. The attribute information includes information related to an element ID, element name, element specification, and the like. The element ID is an identifier that identifies an element. The element name is the name of an element (for example, rebar). The element specification is the specification of, for example, material and size (anchorage length, rebar pitch, rebar diameter, and the like) of an element.

Figure 2B:
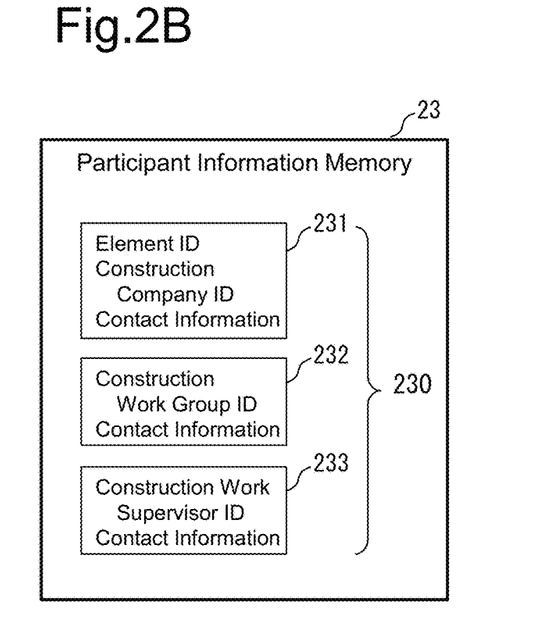

As shown in FIG. 2B, the participant information memory 23 records participant management data 230 related to participants involved in the structure building. The participant management data 230 is recorded if information related to a manager or constructor of the structure is registered to the participant information memory 23 and the information is downloaded from the management server 10. The participant management data 230 includes a construction company record 231, a construction work group record 232, and a construction work supervisor record 233.

The construction company record 231 includes data related to an element ID, a construction company ID, and contact information.

Data related to an identifier that identifies an element constituting a structure is recorded in an element ID data region.

Data related to an identifier that identifies the construction company that performs construction using the element (constructor information) is recorded in a construction company ID data region.

Data related to contact information of the construction company is recorded in a contact information data region.

The construction work group record 232 includes data related to a construction work group ID and contact information.

Data related to an identifier that identifies a construction work group supervising the construction is recorded in a construction work group ID data region.

Data related to contact information of the construction work group is recorded in a contact information data region.

The construction work supervisor record 233 includes data related to a construction work supervisor ID and contact information.

Data related to an identifier that identifies a supervisor of the construction work site is recorded in a construction work supervisor ID data region.

Data related to contact information (for example, email address) of the supervisor of the construction work site is recorded in the contact information data region.

Figure 2C:
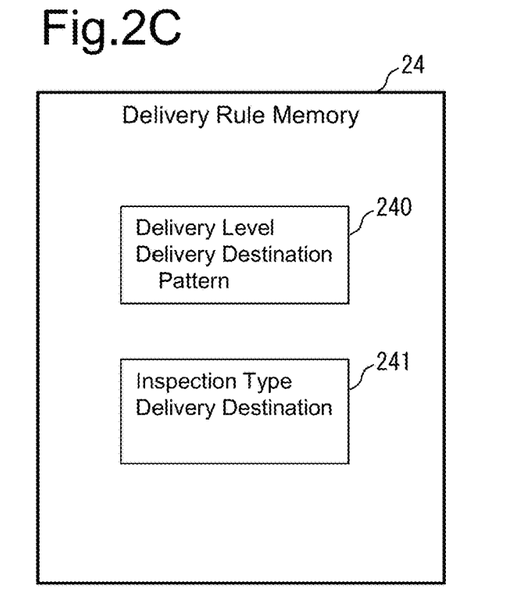

As shown in FIG. 2C, delivery rule data 240 related to a method for determining a delivery destination that should be notified of an inspection result and delivery destination management data 241 are recorded in the delivery rule memory 24. The delivery rule data 240 is recorded if a determined delivery rule and delivery destination are registered to the delivery rule memory 14 and downloaded from the management server 10.

The delivery rule data 240 includes data related to a delivery level and a delivery destination pattern.

A value that identifies an information sharing level identifying a subject who receives an inspection result is recorded in a delivery level data region. The delivery level is calculated from importance and urgency designated by a person in charge of inspection. For example, the importance and urgency are each designated as 1 to 3. In this case, as the importance or urgency becomes higher, a higher value is designated. A value calculated by multiplying the importance and urgency (1 to 9) is used for the delivery level.

Data related to a delivery destination corresponding to a delivery level (for example, construction company ID, construction work group ID, and construction work supervisor) is recorded in the delivery destination pattern. For example, if the delivery level is 1 to 2, which is a normal level, the inspection result is delivered to the construction company and the construction work group related to construction. If the delivery level is 3 to 5, the inspection result is delivered to the construction work supervisor in addition to the delivery destinations of the normal level. If the delivery level is 6 to 9, the inspection result is delivered to all the construction work groups and the site manager in addition to the delivery destinations of the normal level. Further, if the delivery level is greater than or equal to an urgency reference value, urgency delivery, in which the inspection result is instantaneously delivered to all the participants, is performed.

The delivery destination management data 241 includes data related to an inspection type and delivery destination.

Data related to the type of inspection of a structure is recorded in an inspection type data region.

Data related to the delivery destination that should be notified of, in the delivery type data, an inspection result through normal delivery is recorded in a delivery destination data region.

Figure 2D:
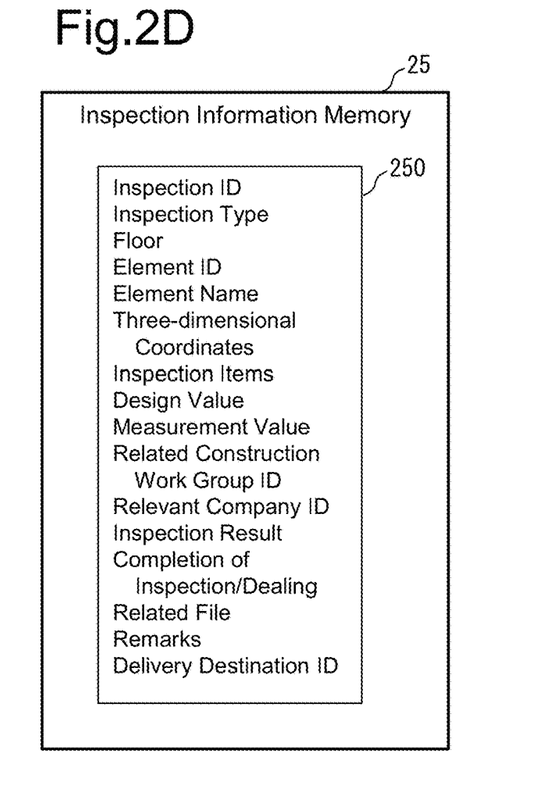

As shown in FIG. 2D, the inspection information memory 25 records an inspection management record 250 related to an inspection result of a structure subject to inspection. The inspection management record 250 is registered to the inspection information memory 15 prior to inspection and recorded in synchronization with the inspection information memory 15 of the management server 10. Thus, when inspection is performed, the inspection information memory 15 of the management server 10 is updated as the inspection information memory 25 of the user terminal 20 is updated. The inspection management record 250 includes data related to inspection ID, inspection type, floor, element ID, element name, three-dimensional coordinates, inspection items, design value, measurement length, related construction work group ID, relevant company ID, inspection result, completion of inspection/dealing, related file, remarks, and delivery destination ID.

Data related to an identifier that identifies each inspection is recorded in an inspection ID data region.

Data related to the type of the inspection is recorded in an inspection type data region.

Data related to an identifier that identifies a floor in a structure is recorded in a floor data region.

Data related to an identifier that identifies an element subject to inspection is recorded in an element ID data region.

Data related to the name of an inspection subject is recorded in an element name data region.

Data related to the coordinates that identify an indication position in the inspection result is recorded in a three-dimensional coordinate data region.

Data related to an identifier that identifies an inspection item is recorded in an inspection item data region.

Data related to a design value of the inspection item is recorded in a design value data region.

Data related to a value that has been actually measured in the inspection item is recorded in a measurement value data region.

Data related to an identifier that identifies a construction work group in charge of the inspection item is recorded in a related construction work group ID data region.

Data related to an identifier that identifies the construction company or the like of the element is recorded in a relevant company ID data region.

Data related to an inspection determination (pass/fail) with inspection is recorded in an inspection result data region. Further, data related to importance and urgency when the inspection item needs to be dealt with is recorded in the inspection result data region.

A flag that identifies a dealing situation of the inspection item is recorded in an inspection/dealing complete data region.

Data related to a link destination of data related to inspection is recorded in a related file data region. For the related file, a three-dimensional model and writing of the structure and an image (two-dimensional image, a stereo image, or three-dimensional point group data) indicating an inspection situation or patrol situation can be used.

Data related to a comment such as an indication matter given by a person in charge of inspection is recorded in a remarks data region.

An identifier that identifies a participant delivering the inspection result is recorded in a delivery destination ID data region.

The procedures for inspecting a structure with the user terminal 20 will now be described with reference to FIGS. 3 to 7E.

Inspection Assistance Process

Figure 3:
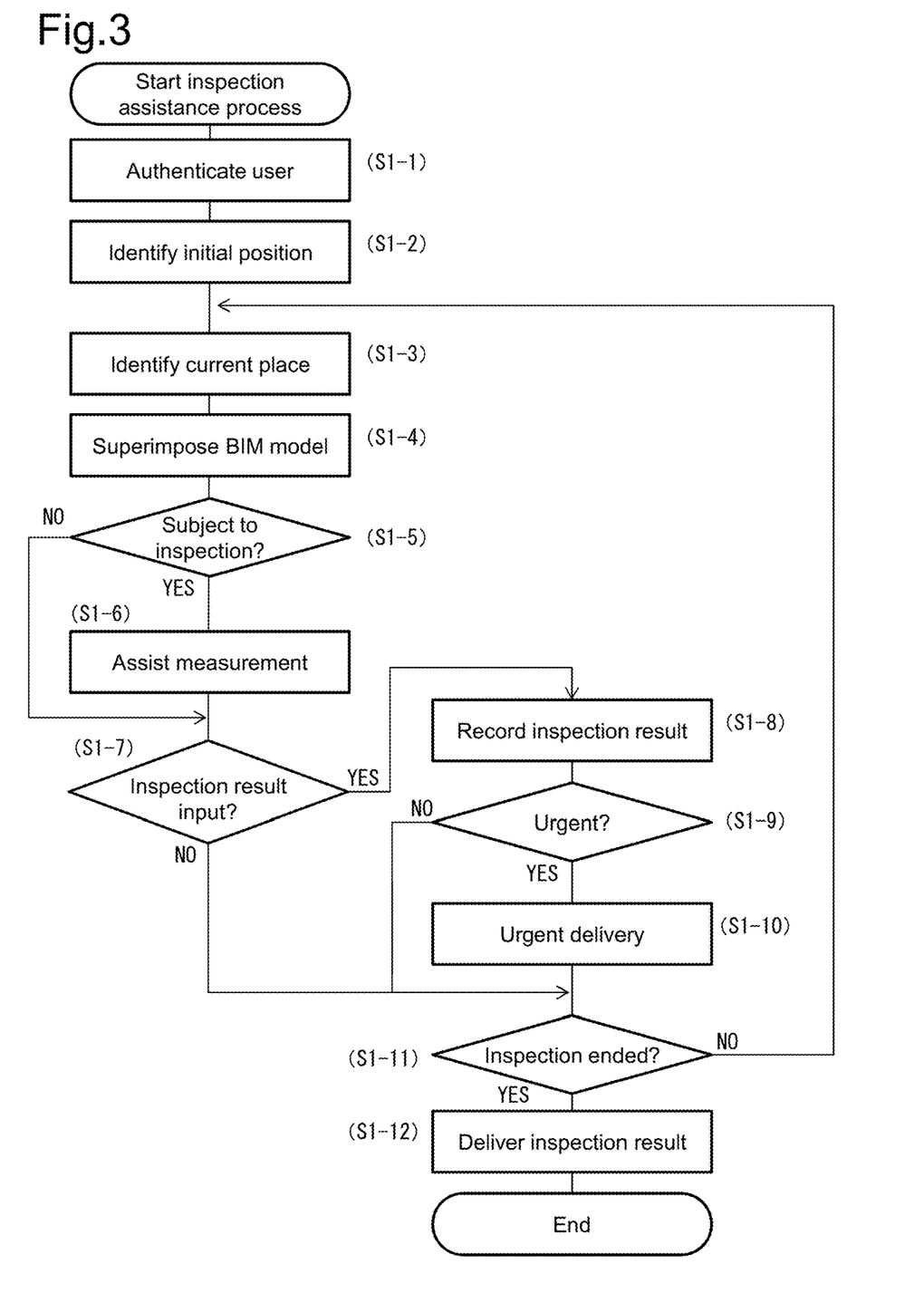
FIGS. 3 and 4 are flowcharts illustrating the procedures of the system shown in FIG. 1, respectively.

The inspection assistance process will now be described with reference to FIG. 3. This process is executed if inspection is performed using the user terminal 20. First, a person in charge of inspection moves to a position where the person can photograph the initial position marker attached to a structure. In the user terminal 20, the inspection processing program is activated.

In this case, the control unit 21 of the user terminal 20 executes a user authentication process (step S1-1). More specifically, the user authentication unit 210 of the control unit 21 outputs a login view to which user information is input. The user authentication unit 210 identifies a person in charge of inspection (for example, person in charge at construction work group) based on a user ID input to the login view.

Next, the control unit 21 executes a process for identifying the initial position (step S1-2). More specifically, the position identification unit 211 of the control unit 21 outputs a photographing instruction of a marker to the touch panel display 26. The person in charge of inspection photographs the initial position marker using the camera 28 of the user terminal 20. In this case, the position identification unit 211 identifies the initial position of the user terminal 20 (person in charge of inspection) in the virtual space based on the distance and direction to the initial position marker.

The person in charge of inspection patrols the site for the purpose of inspection carrying the user terminal 20.

In this case, the control unit 21 executes a process for identifying the current place (step S1-3). More specifically, the position identification unit 211 of the control unit 21 obtains acceleration information from the inertia measurement unit 27 and calculates the movement direction and movement distance based on the acceleration information. The position identification unit 211 adds the movement distance in the movement direction with respect to the coordinates of the initial position and identifies the current position.

Then, the control unit 21 executes a superimposition displaying process of a BIM model (step S1-4). More specifically, the image generation unit 212 of the control unit 21 identifies the orientation of the user terminal 20 based on the acceleration information obtained from the inertia measurement unit 27. Subsequently, in the BIM space, the image generation unit 212 arranges a viewpoint on the current place of the camera 28 of the user terminal 20, identifies a visual range based on the orientation of the user terminal 20, and generates a two-dimensional image (BIM image) of an element subject to inspection. For the BIM image, a virtual image having a predetermined transmittance is used.

Next, the image output unit 213 outputs an image photographed with the camera 28 to the touch panel display 26. The image output unit 213 superimposes, on the photographed image, a two-dimensional image generated by the image generation unit 212.

Figure 5:
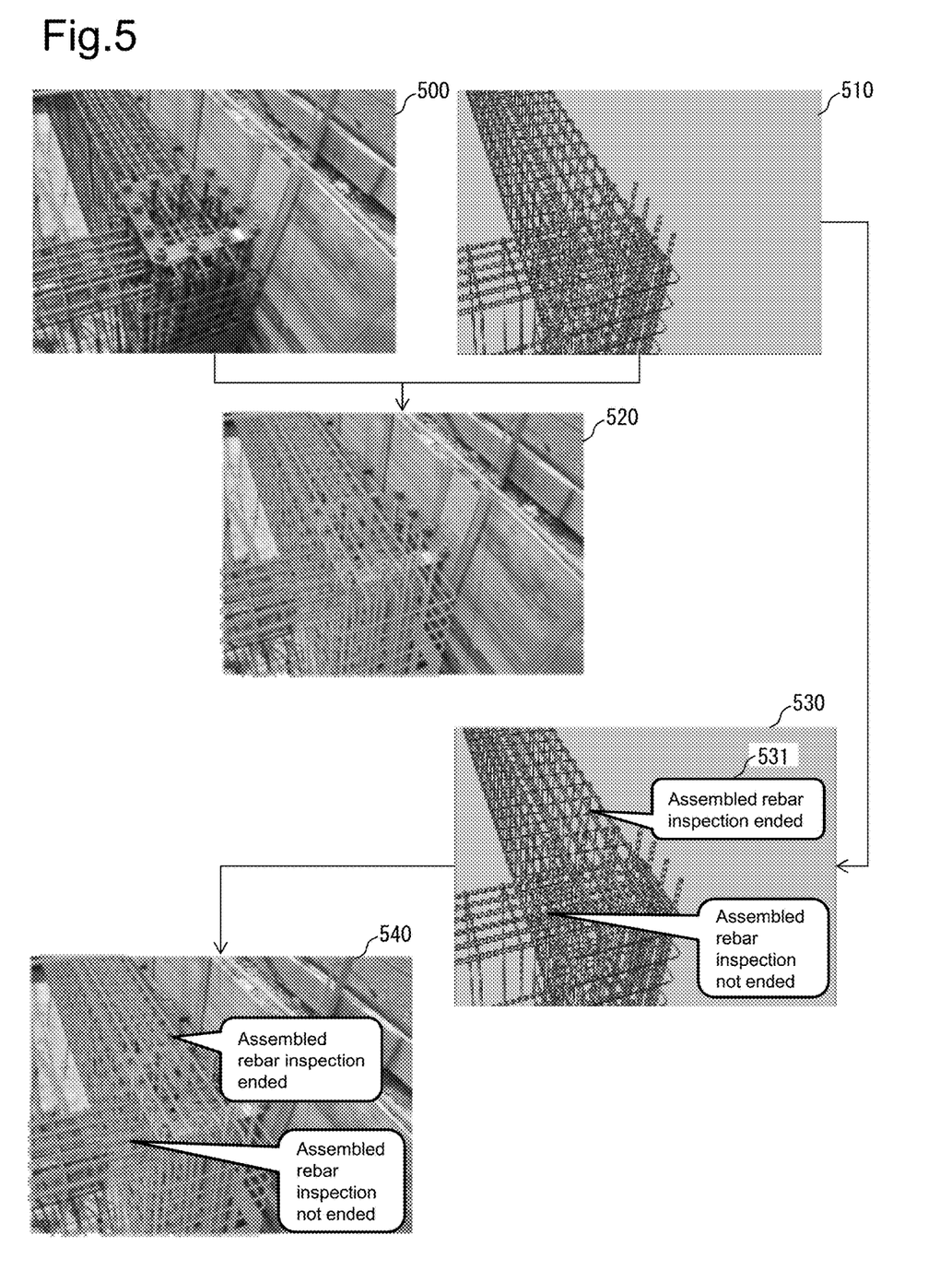
FIG. 5 shows pictures illustrating output images of the system shown in FIG. 1.

In this case, as shown in FIG. 5, a BIM image 510 corresponding to a photographed image 500 is generated. The image output unit 213 generates an output image 520, in which the BIM image 510 is superimposed on the photographed image 500, and outputs the output image 520 to the touch panel display 26.

Afterwards, the control unit 21 executes a process for determining whether or not an element is subject to inspection (step S1-5). More specifically, the inspection assistance unit 214 of the control unit 21 uses attribute information of a three-dimensional model to identify an element included in a two-dimensional image. The inspection assistance unit 214 determines that the element is subject to inspection if the element ID is recorded in the inspection information memory 25.

If the control unit 21 determines that the element is subject to inspection ("YES" in step S1-5), the control unit 21 executes a measurement assistance process (step S1-6). More specifically, the inspection assistance unit 214 outputs a message indicating that an inspection subject is included to the touch panel display 26. Additionally, as described below, the measurement assistance unit 215 executes a measurement assistance process for measuring the rebar diameter, pitch, anchorage length, and the like of the inspection subject (FIGS. 6A, 6B, and 7A to 7E).

If the control unit 21 determines that an element subject to inspection is not included and that the element is not subject to inspection ("NO" in step S1-5), the control unit 21 skips the measurement assistance process (step S1-6).

Then, the control unit 21 executes a process for determining whether or not an inspection result has been input (step S1-7). More specifically, if a person in charge of inspection inputs an inspection result, the person inputs a display instruction of an information registration view. In this case, the inspection assistance unit 214 determines that the inspection result has been input and causes the touch panel display 26 to display the information registration view. If shared information of some indication matters or the like is input separately from inspection, the information registration view may also be used.

If the control unit 21 determines that the inspection result has been input ("YES" in step S1-7), the control unit 21 executes a process for recording the inspection result (step S1-8). More specifically, the person in charge of inspection inputs the measurement value and the inspection result (pass or fail, importance and urgency) to the information registration view. Further, an image in which a situation is photographed is generated, and a saving destination is input. If the inspection assistance unit 214 obtains a saving instruction of the input information, the inspection assistance unit 214 generates the inspection management record 250 in which the measurement value, the inspection result, and the three-dimensional coordinates of the current place in the BIM space are recorded and then records the inspection management record 250 in the inspection information memory 25. In addition, if writing is performed on the three-dimensional model at a site or if a situation of the site is photographed using the camera 28, the inspection assistance unit 214 records the writing information and the saving destination information of a photographed image (stereo image, three-dimensional point group data, or the like) in the related file data region of the inspection management record 250. Further, if the inspection assistance unit 214 obtains an input instruction of a comment on the information registration view, the inspection assistance unit 214 records the input instruction in the remarks data region of the inspection management record 250.

Next, the control unit 21 executes a process for determining whether or not there is urgency (steps S1-9). More specifically, the delivery processing unit 216 of the control unit 21 calculates a delivery level based on the importance and urgency recorded in the inspection management record 250. If the delivery level is greater than or equal to the urgency reference value recorded in the delivery rule data 240 of the delivery rule memory 24, the delivery processing unit 216 determines that there is urgency.

If the control unit 21 determines that there is urgency ("YES" in step S1-9), the control unit 21 executes an urgent delivery process (step S1-10). More specifically, the delivery processing unit 216 identifies a delivery destination corresponding to a delivery level, obtains the contact information of all the participants from the participant information memory 23, and delivers an urgent message.

If the control unit 21 determines that there is no urgency ("NO" in step S1-9), the control unit 21 skips the urgent delivery process (step S1-10).

Subsequently, the control unit 21 executes a process for determining whether or not the inspection has ended (step S1-11). More specifically, if an end input is performed on the touch panel display 26, the inspection assistance unit 214 determines that the inspection has ended.

If the control unit 21 determines that the inspection has not ended ("NO" in step S1-11), the control unit 21 repeats the processes subsequent to the process for identifying the current place (step S1-3).

If the control unit 21 determines that the inspection has ended ("YES" in step S1-11), the control unit 21 executes a process for delivering the inspection result (step S1-12). More specifically, the delivery processing unit 216 of the control unit 21 identifies an inspection result that requires notification based on the inspection result of the inspection management record 250 recorded in the inspection information memory 25. The delivery processing unit 216 calculates a delivery level based on the importance and urgency recorded in the inspection management record 250. Next, the delivery processing unit 216 uses the delivery rule data 240 of the delivery rule memory 24 to identify the delivery destination pattern corresponding to the delivery level. The delivery processing unit 216 records, in the delivery destination ID data region recorded in the inspection management record 250, the delivery destination (related construction work group ID, relevant company ID, or construction work supervisor ID) identified by the delivery destination pattern. Additionally, the delivery processing unit 216 obtains the contact information of the identified delivery destination from the participant information memory 23 and delivers the inspection result to the participant.

Information Displaying Process

Figure 4:
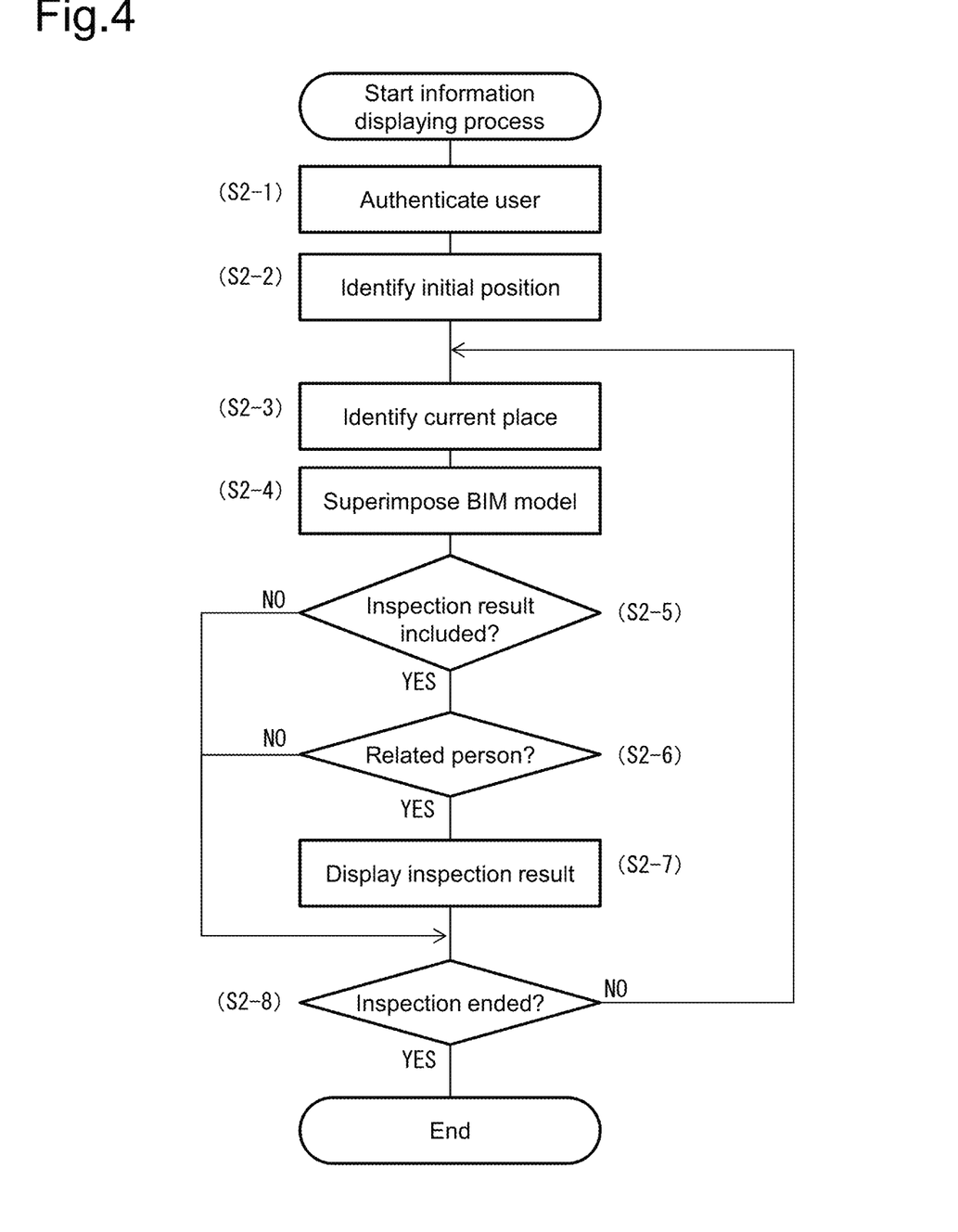

The information displaying process will now be described with reference to FIG. 4. This process is executed if an inspection result is checked using the user terminal 20. In this case, the user (construction work group, person in charge at construction company, or the like) moves to a position where the user can photograph the initial position marker attached to a structure. In the user terminal 20, an inspection result displaying program is activated.

In this case, the control unit 21 executes the user authentication process in the same manner as step S1-1 (step S2-1). In this case, the user authentication unit 210 also identifies the user based on a user ID input to the login view.

Then, in the same manner as steps S1-2 to S1-4, the control unit 21 executes a process for identifying the initial position (step S2-2), a process for identifying the current place (step S2-3), and a superimposition displaying process of the BIM model (step S2-4).

Subsequently, the control unit 21 executes a process for determining whether or not an inspection result is included (step S2-5). More specifically, the inspection assistance unit 214 of the control unit 21 identifies an element ID included in a two-dimensional image. If the inspection management record 250 about the element ID is recorded in the inspection information memory 25 of the inspection management record 250, the inspection assistance unit 214 determines that the inspection result is included.

If the control unit 21 determines that the inspection result is included ("YES" in step S2-5), the control unit 21 executes a process for determining whether or not the user is a related person (step S2-6). More specifically, if the authenticated user ID is recorded in each of the data regions of the relevant construction work group ID, the relevant company ID, and the delivery destination ID, the inspection assistance unit 214 determines that the user is a related person.

If the control unit 21 determines that the user is a related person ("YES" in step S2-6), the control unit 21 executes a process for displaying an inspection result (step S2-7). More specifically, the image output unit 213 outputs an icon including the inspection result to an image displayed on the touch panel display 26. This icon is linked to the inspection management record 250. If shared information of indication matters or the like other than the inspection result is recorded, an icon corresponding to the shared information is displayed on the touch panel display 26 in the same manner. By selecting the icon, the content of the inspection management record 250 can be checked.

In this case, as shown in FIG. 5, the BIM image 510 corresponding to the photographed image 500 is generated. Further, if the inspection management record 250 is recorded, the image output unit 213 generates a BIM image 530 including an icon 531 that displays an inspection result. The image output unit 213 generates an output image 540, in which the BIM image 530 is superimposed on the photographed image 500, and outputs the output image 540 to the touch panel display 26.

If the control unit 21 determines that the inspection result is not included or determines that the user is not a related person ("NO" in step S2-5 or step S2-6), the control unit 21 skips the process for displaying the inspection result (step S2-7).

In the same manner as step S1-11, the control unit 21 executes a process for determining whether or not the inspection has ended (step S2-8). If the control unit 21 determines that the inspection has not ended ("NO" in step S2-8), the control unit 21 repeats the processes subsequent to the process for identifying the current place (step S2-3).

If the control unit 21 determines that the inspection has ended ("YES" in step S2-8), the control unit 21 ends the process for displaying the inspection result.

Measurement Assistance Process of Anchorage Length

The measurement assistance process of the anchorage length will now be described with reference to FIGS. 6A and 6B.

Figure 6A:
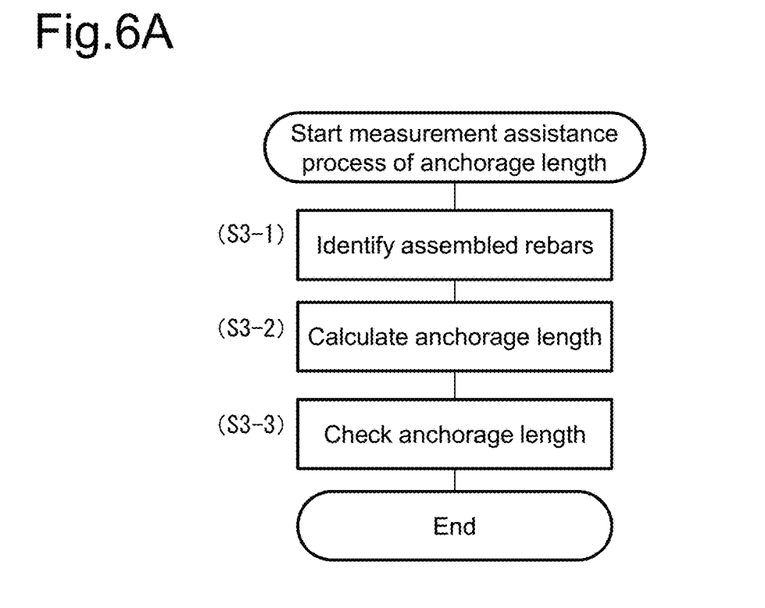
FIG. 6A is a flowchart illustrating the procedures in an anchorage length measurement assistance process of the system shown in FIG. 1.

As shown in FIG. 6A, the control unit 21 executes a process for identifying assembled rebars (step S3-1). More specifically, the measurement assistance unit 215 identifies an end of a column rebar in a BIM image superimposed on a photographed image. Further, the measurement assistance unit 215 identifies, in the photographed image, an anchoring device through image recognition. If an anchoring device cannot be identified through image recognition, the person in charge of inspection may designate an anchoring device on the touch panel display 26.

Figure 6B:
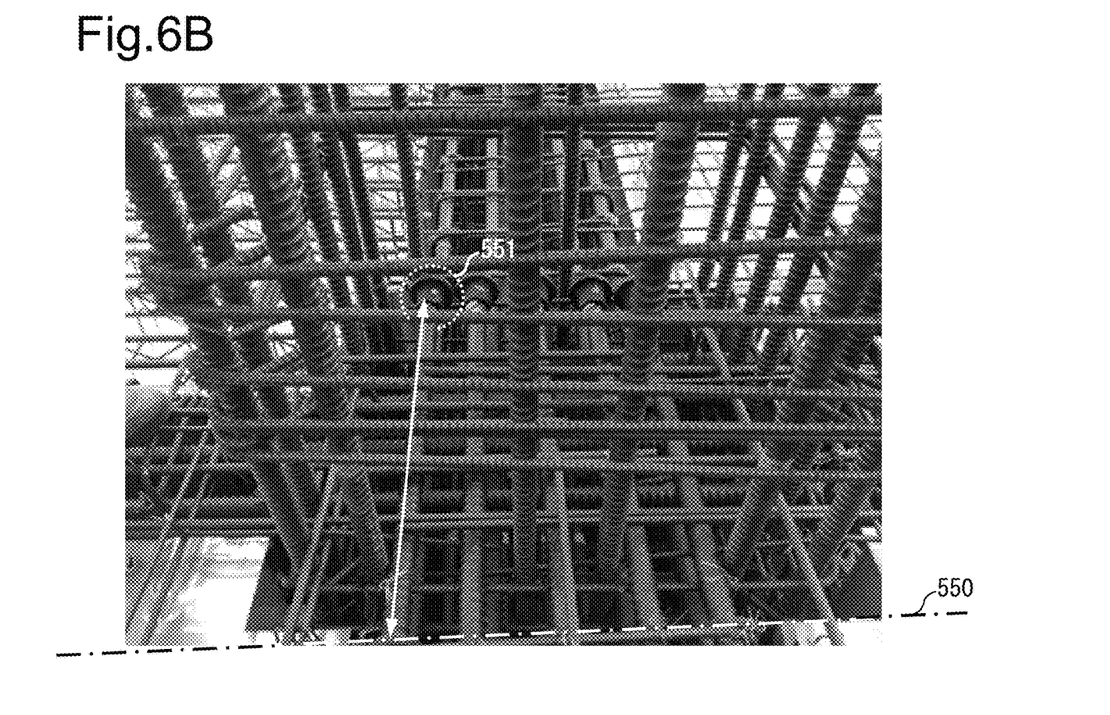
FIG. 6B is a picture illustrating a method for calculating an anchorage length in the anchorage length measurement assistance process of the system shown in FIG. 1.

As shown in FIG. 6B, the measurement assistance unit 215 identifies an end 550 of a column rebar and an anchoring device 551 in an image photographed with the camera 28.

Next, the control unit 21 executes a process for calculating an anchorage length (step S3-2). More specifically, the measurement assistance unit 215 calculates the length from the end 550 of the column rebar to the anchoring device 551 through three-dimensional measurement of the image photographed with the camera 28.

Then, the control unit 21 executes a process for checking the anchorage length (step S3-3). More specifically, the measurement assistance unit 215 compares the calculated anchorage length (measurement value) with the design value of the inspection item (anchorage length) recorded in the inspection management record 250 of the inspection information memory 25. If the measurement value is within an allowable range set in advance for the design value, the measurement assistance unit 215 records pass as the inspection result. If the measurement value exceeds the allowable range, the measurement assistance unit 215 records fail as the inspection result.

Measurement Assistance Process of Pitch and Rebar Diameter

The measurement assistance process of pitch and rebar diameter will now be described with reference to FIGS. 7A to 7E.

Figure 7A:
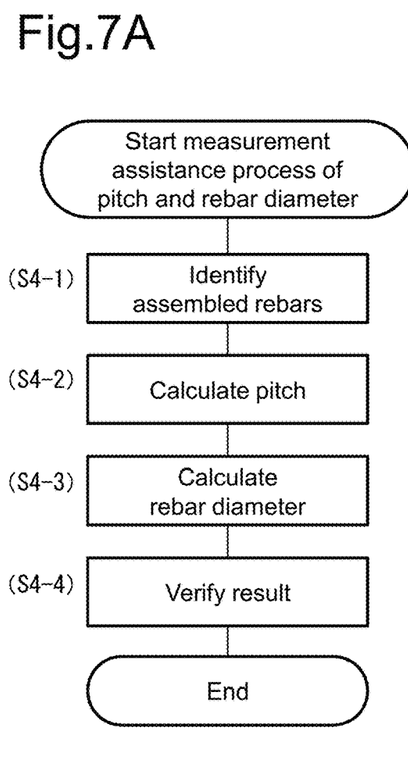
FIG. 7A is a flowchart illustrating the procedures for a measurement assistance process of a pitch and rebar diameter of the system shown in FIG. 1.

As shown in FIG. 7A, the control unit 21 executes a process for identifying assembled rebars (step S4-1). More specifically, the measurement assistance unit 215 identifies the assembled rebars using a photographed image (point group data) of a column rebar.

Figure 7B:
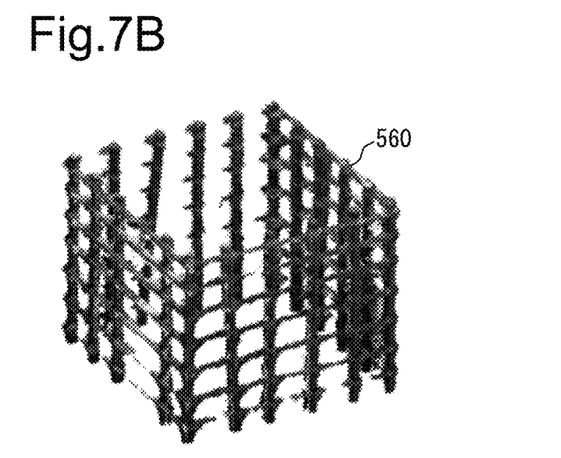
FIGS. 7B to 7E are pictures respectively illustrating point group data, a pitch measurement frame, a pitch calculation method, and a rebar diameter calculation method in the measurement assistance process of the pitch and rebar diameter of the system shown in FIG. 1.

In this case, point group data 560 shown in FIG. 7B is obtained.

Then, the control unit 21 executes a process for calculating a pitch (step S4-2). More specifically, the measurement assistance unit 215 cuts out a predetermined region of the point group data 560 to identify an inspection surface of the column rebar. The measurement assistance unit 215 identifies a column main bar and a hoop bar on the inspection surface.

Figure 7C:
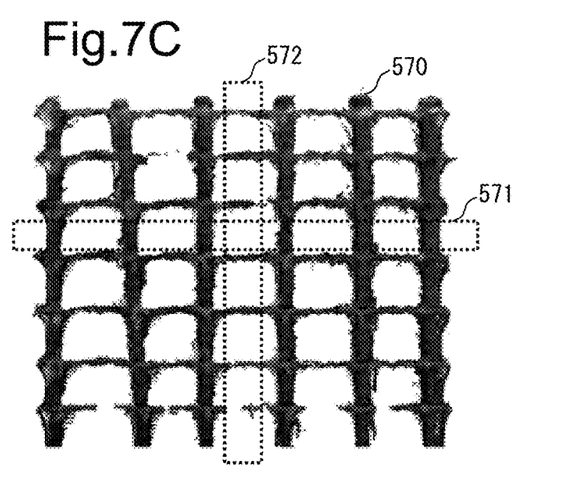

As shown in FIG. 7C, on an inspection surface 570, a main bar frame 571 is set in a horizontal direction and a hoop bar frame 572 is set in a vertical direction as a reference unit length. The main bar frame 571 and the hoop bar frame 572 are each arranged to vertically intersect the extension direction of a rebar subject to inspection. Subsequently, the measurement assistance unit 215 calculates the number of rebars from an aggregation of point group data included in each frame (571, 572). The measurement assistance unit 215 calculates a pitch by dividing the reference unit length by the number of rebars.

Figure 7D:
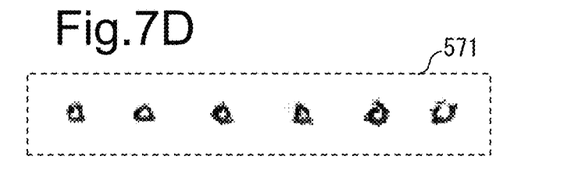

As shown in FIG. 7D, six rebars (main bars) are detected in the main bar frame 571.

Subsequently, the control unit 21 executes a process for calculating a rebar diameter (step S4-3). More specifically, in the point group data, the measurement assistance unit 215 calculates a circle on the outer edge of each rebar. The measurement assistance unit 215 calculates the rebar diameter from the diameter of the circle.

Figure 7E:
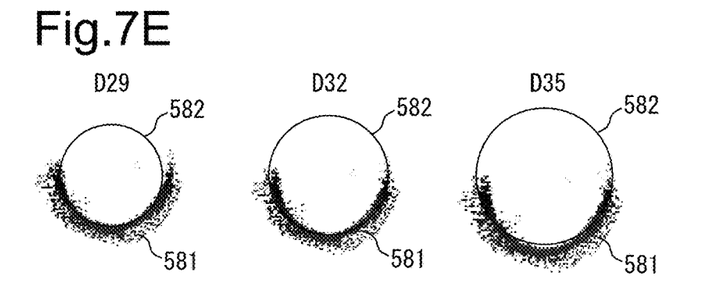

As shown in FIG. 7E, the measurement assistance unit 215 fits the point group data 581 with rebar circles 582 of D29, D32, and D35 to predict each rebar diameter.

Afterwards, the control unit 21 executes a process for verifying a result (step S4-4). More specifically, the measurement assistance unit 215 compares the measurement value of the calculated pitch and the rebar diameter with the design value of the inspection item (pitch and rebar diameter) recorded in the inspection management record 250 of the inspection information memory 25. In this case, if the measurement value is within the allowable range set in advance for the design value, the measurement assistance unit 215 records pass as the inspection result. If the measurement value exceeds the allowable range, the measurement assistance unit 215 records fail as the inspection result.

The inspection processing system of the present embodiment has the advantages described below.

(1) In the present embodiment, the control unit 21 executes the process for identifying the initial position (steps S1-2 and S2-2), the process for identifying the current place (steps S1-3 and S2-3), and the superimposition displaying process of a BIM model (steps S1-4 and S2-4). This allows for inspection using a BIM image corresponding to the current position. In particular, the superimposition of a photographed image and a BIM image allows for efficient understanding of the difference between the design and the actual installation.

(2) In the present embodiment, the control unit 21 executes the process for determining whether or not an element is subject to inspection (step S1-5). If the control unit 21 determines that the element is subject to inspection ("YES" in step S1-5), the control unit 21 executes the measurement assistance process (step S1-6). This allows a person in charge of inspection to easily understand inspection points.

(3) In the present embodiment, if the control unit 21 determines that an inspection result has been input ("YES" in step S1-7), the control unit 21 executes the process for recording the inspection result (step S1-8). If the control unit 21 determines that there is urgency ("YES" in step S1-9), the control unit 21 executes the urgent delivery process (step S1-10). Thus, information about the inspection result having high importance and urgency can immediately be shared among participants.

(4) In the present embodiment, if the control unit 21 determines that the inspection has ended ("YES" in step S1-11), the control unit 21 executes the process for delivering the inspection result (step S1-12). This allows information to be shared among participants.

(5) In the present embodiment, if the control unit 21 determines that an inspection result is included ("YES" in step S2-5), the control unit 21 executes the process for determining whether or not the user is a related person (step S2-6). If the control unit 21 determines that the user is a related person ("YES" in step S2-6), the control unit 21 executes the process for displaying the inspection result (step S2-7). This allows the participant (logged-in user) to check the inspection result using a photographed image on which a BIM image is superimposed.

(6) In the present embodiment, the control unit 21 executes the process for identifying assembled rebars (step S3-1), the process for calculating an anchorage length (step S3-2), and the process for checking the anchorage length (step S3-3). Thus, the inspection of the anchorage length of a rebar can be assisted using a photographed image.

(7) In the present embodiment, the control unit 21 executes the process for identifying assembled rebars (step S4-1), the process for calculating a pitch (step S4-2), the process for calculating a rebar diameter (step S4-3), and the process for verifying a result (step S4-4). Thus, the inspection of a rebar pitch and a rebar diameter can be assisted using point group data.

It should be apparent to those skilled in the art that the present disclosure may be embodied in many other specific forms without departing from the spirit or scope of the disclosure. Particularly, it should be understood that the present disclosure may be embodied in the following forms.

In the above embodiment, the management server 10 and the user terminal 20 are used. The hardware configuration is not limited to these elements. For example, data obtained in the user terminal 20 may be used so that the management server 10 performs various types of information processing and outputs the processing result with the user terminal 20.

In the above embodiment, the user terminal 20 includes the touch panel display 26. The superimposition displaying of a BIM model may be performed with a head-mounted display (HMD).

In the above embodiment, the current position and orientation of the user terminal 20 are identified based on acceleration information obtained from the inertia measurement unit 27. However, the current position does not have to be identified in such a manner. For example, a global positioning system (GPS) or the technique described in Japanese Laid-Open Patent Publication No. 2017-45404 may be used.

In the above embodiment, the control unit 21 executes the superimposition displaying process of a BIM model (step S1-4). The method for displaying a BIM image may be changed based on an evaluation result of the measurement assistance process. For example, the control unit 21 changes the color scheme of a BIM image based on a fitting status between the BIM image and a structure image. More specifically, the image output unit 213 calculates the difference between a BIM image and a structure image for each region. The image output unit 213 displays the BIM image in a thick, vivid color for a region having a large difference between the BIM image and the structure image and displays the BIM image with a high transparency for a region having a small difference between the BIM image and the structure image.

Figure 8A:
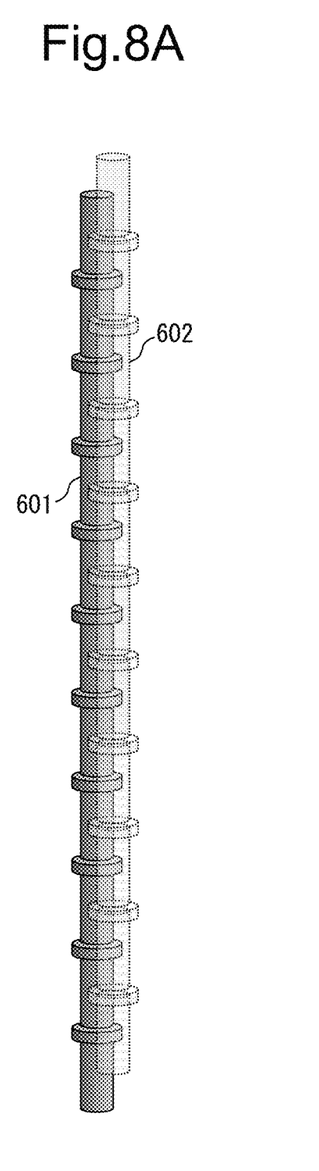
FIG. 8A is a diagram illustrating an output image having a small difference in a further embodiment.
Figure 8B:
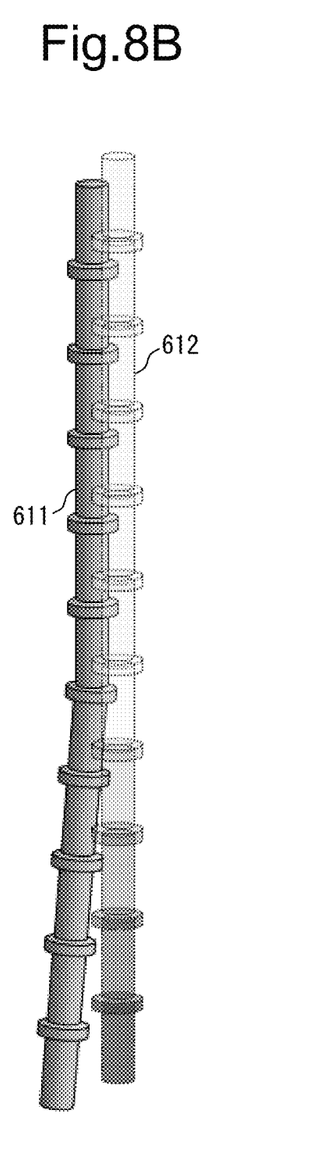
FIG. 8B is a diagram illustrating an output image having a large difference in a further embodiment.

In FIG. 8A, a structure image 601 matches a BIM image 602. Thus, the BIM image 602 is displayed in a thin color. In FIG. 8B, a structure image 611 deviates from a BIM image 612. Thus, the color of the BIM image 612 is changed and displayed thick in a lower region, where the structure image 611 greatly deviates from the BIM image 602.

In the above embodiment, the control unit 21 executes the superimposition displaying process of a BIM model (step S1-4). In this case, a virtual image set at a predetermined transmittance is used as a BIM image. Instead, the image output unit 213 may extract the contour of a three-dimensional model of an element and use a virtual image with a frame model.

In the above embodiment, the control unit 21 executes the process for recording an inspection result (step S1-8). In this case, the person in charge of inspection inputs, to the information registration view, an inspection item determination result including importance and urgency. Instead, the inspection assistance unit 214 of the control unit 21 may assist determination of importance and urgency. For example, the inspection assistance unit 214 determines importance and urgency using the content of an inspection item and attribute information of a three-dimensional model recorded in the BIM information memory 22. In this case, if the difference between the design value and the measurement value is large, the inspection assistance unit 214 increases the importance. Further, weighting may be performed for importance in accordance with an inspection item. For example, weighting is set to be large for an element that is difficult to deal with and an inspection item that would greatly affect other constructions.

Further, importance and urgency may be determined in accordance with a construction schedule. In this case, for example, the user terminal 20 includes a schedule memory that records the schedule of each construction. Further, the control unit 21 causes the user terminal 20 to keep a dealing period table that is used to calculate a time required for dealing in accordance with the inspection result (for example, difference between design value and measurement value) of each inspection item. In the inspection assistance process, the inspection assistance unit 214 obtains, from the schedule memory, the schedule (scheduled date) of a subsequent construction in which elements subject to inspection are affected. In addition, the inspection assistance unit 214 obtains a required time corresponding to the inspection result from the dealing period table. The inspection assistance unit 214 determines urgency based on the comparison of a correction scheduled date, which is obtained by adding a required time to the current date, with a subsequent construction scheduled date. The inspection assistance unit 214 calculates a high urgency if the correction scheduled date is close to the subsequent construction scheduled date or the correction scheduled date passes the subsequent construction scheduled date.

In the above embodiment, the control unit 21 executes the superimposition displaying process of a BIM model (step S1-4). The control unit 21 generates the output image 520, in which the BIM image 510 is superimposed on the photographed image 500, and outputs the output image 520 to the touch panel display 26. The superimposition displaying process is used for the inspection assistance process and the measurement assistance process of a rebar and the like. The inspection subject is not limited to a rebar.

For example, the superimposition displaying process may be applied to measurement and surveying of pile centering or the like. In this case, the control unit 21 causes the user terminal 20 to keep pile centering layout information. The control unit 21 generates a pile core or a baseline corresponding to the pile centering layout as a three-dimensional model of a structure. Then, the control unit 21 uses the three-dimensional model to generate a virtual image corresponding to the current position and superimpose the virtual image on a photographed image.

Further, the superimposition displaying process may be applied to measurement and surveying of plumbing or the like of a steel frame or precast concrete (PCa) element. In this case, the control unit 21 uses a BIM model of a steel frame or PCa as a three-dimensional model of a structure to generate a virtual image corresponding to the current position and superimpose the virtual image on a photographed image.

In addition, the superimposition displaying process may be applied to interference checking of a seismic reinforcement iron frame and facility and interference checking of a scaffold and skeleton. In this case, the control unit 21 uses a BIM model of a seismic reinforcement iron frame and facility and a BIM model of a scaffold and skeleton as a three-dimensional model of a structure to generate a virtual image corresponding to the current position and superimpose the virtual image on a photographed image.

Thus, the superimposition displaying process may be applied to surveying, measurement, inspection, and the like using a superimposed image of an invisible part that cannot be seen in the real space (for example, design) and a visible part that can be seen (for example, current state).

The control unit 21 is not limited to a device that performs a software process for all the processes executed by the control unit 21. For example, the control unit 21 may include a dedicated hardware circuit (for example, application specific integrated circuit (ASIC)) that performs a hardware process for at least part of the processes executed by the control unit 21. That is, the control unit 21 may be configured by circuitry including (1) one or more processors running on computer programs (software), (2) one or more dedicated hardware circuits that execute at least part of various types of processes, or (3) a combination thereof. The processor includes a CPU and a memory such as a ROM or a RAM, which store programs executed by the CPU. The memory, or computer readable medium, includes any type of medium that is accessible by a versatile computer or dedicated computer.

Therefore, the present examples and embodiments are to be considered as illustrative and not restrictive and the disclosure is not to be limited to the details given herein, but may be modified within the scope and equivalence of the appended claims.

The invention claimed is:

1. An inspection processing system comprising a user terminal, wherein the user terminal includes circuitry, the circuitry is configured to:
   identify a current position at which the user terminal is currently positioned m a construction or building site that includes a building structure;
   generate, in response to the user terminal currently being positioned at the current position, a virtual image of the building structure that corresponds to the current position, the generation of the virtual image being from data of a designed three-dimensional model of the building structure;
   obtain, with the user terminal, an actual structure image of the building structure at the current position;
   superimpose the virtual image on the actual structure image;
   obtain a measurement value for an evaluation item of an inspection subject of the building structure by measuring the actual structure image in the superimposition of the virtual image on the actual structure image, the measurement value including at least one of a size of the inspection subject or a number of the inspection subject;
   obtain an evaluation result of the evaluation item by comparing at least one of the obtained size of the inspection subject or number of the inspection subject with a design value for the evaluation item obtained from the three-dimensional model; and
   record the evaluation result in an inspection information memory in association with the position of the inspection subject in the three-dimensional model.

2. The inspection processing system according to claim 1, wherein the circuitry is further configured to:
   generate the virtual image to have a predetermined transmittance, and
   display the virtual image as being superimposed on the actual structure image according to the predetermined transmittance.

3. The inspection processing system according to claim 1, wherein the circuitry is further configured to:
   generate the virtual image according to a contour of the building structure that corresponds to the current position as indicated by the three-dimensional model.

4. The inspection processing system according to claim 1, wherein the circuitry is further configured to:
   change a manner of displaying the virtual image based on the evaluation result.

5. The inspection processing system according to claim 4, wherein the circuitry is further configured to:
   change a color scheme of the virtual image based on a fitting status between the virtual image and the actual structure image in the evaluation result.

6. The inspection processing system according to claim 1, wherein the circuitry is further configured to:
   calculate the evaluation result of the actual structure image based on attribute information of the three-dimensional model.

7. The inspection processing system according to claim 1, wherein the evaluation result of the evaluation item indicates whether an inspection result of the inspection subject is one of pass or fail for the evaluation item.

8. A method for assisting inspection using an inspection processing system comprising:
   identifying a current position at which a user terminal is currently positioned in a construction or building site that includes a building structure;
   generating, in response to the user terminal currently being positioned at the current position, a virtual image of the building structure that corresponds to the current position, the generation of the virtual image being from data of a designed three-dimensional model of the building structure;
   obtaining, with the user terminal, an actual structure image of the building structure at the current position;
   superimposing the virtual image on the actual structure image;
   obtaining a measurement value for an evaluation item of an inspection subject of the building structure by measuring the actual structure image in the superimposition of the virtual
   image on the actual structure image, the measurement value including at least one of a size of the inspection subject or a number of the inspection subject;
   obtaining an evaluation result of the evaluation item by comparing at least one of the obtained size of the inspection subject or number of the inspection subject with a design value for the evaluation item obtained from the three-dimensional model; and
   recording the evaluation result in an inspection information memory in association with the position of the inspection subject in the three-dimensional model.

9. The method according to claim 8, the method further comprising:

generating the virtual image to have a predetermined transmittance, and displaying the virtual image as being superimposed on the actual structure image according to the predetermined transmittance.

10. The method according to claim 8, the method further comprising:

generating the virtual image according to a contour of the building structure that corresponds to the current position as indicated by the three-dimensional model.

11. The method according to claim 8, the method further comprising:

changing a manner of displaying the virtual image based on the evaluation result.

12. The method according to claim 11, the method further comprising:

changing a color scheme of the virtual image based on a fitting status between the virtual image and the actual structure image in the evaluation result.

13. The method according to claim 8, the method further comprising:

calculating the evaluation result of the actual structure image based on attribute information of the three-dimensional model.

14. The method according to claim 8, wherein the evaluation result of the evaluation item indicates whether an inspection result of the inspection subject is one of pass or fail for the evaluation item.

15. A non-transitory computer-readable medium that stores a program thereon, wherein the program, when executed by circuitry of a control unit of an inspection processing system connected to a photographing unit and an output unit, causes the circuitry to:

identify a current position at which a user terminal is currently positioned in a construction or building site that includes a building structure;

generate, in response to the user terminal currently being positioned at the current position, a virtual image of the building structure that corresponds to the current position, the generation of the virtual image being from data of a designed three-dimensional model of the building structure;

obtain, with the user terminal, an actual structure image of the building structure at the current position;

superimpose the virtual image on the actual structure image;

obtain a measurement value for an evaluation item of an inspection subject of the building structure by measuring the actual structure image in the superimposition of the virtual image on the actual structure image, the measurement value including at least one of a size of the inspection subject or a number of the inspection subject;

obtain an evaluation result of the evaluation item by comparing at least one of the obtained size of the inspection subject or number of the inspection subject with a design value for the evaluation item obtained from the three-dimensional model; and record the evaluation result in an inspection information memory in association with the position of the inspection subject in the three-dimensional model.

16. The non-transitory computer-readable medium according to claim 15, wherein the program, when executed by the circuitry, further causes the circuitry to:

generate the virtual image to have a predetermined transmittance, and display the virtual image as being superimposed on the actual structure image according to the predetermined transmittance.

17. The non-transitory computer-readable medium according to claim 15, wherein the program, when executed by the circuitry, further causes the circuitry to:

generate the virtual image according to a contour of the building structure that corresponds to the current position as indicated by the three-dimensional model.

18. The non-transitory computer-readable medium according to claim 15, wherein the program, when executed by the circuitry, further causes the circuitry to:

change a manner of displaying the virtual image based on the evaluation result.

19. The non-transitory computer-readable medium according to claim 18, wherein the program, when executed by the circuitry, further causes the circuitry to:

change a color scheme of the virtual image based on a fitting status between the virtual image and the actual structure image in the evaluation result.

20. The non-transitory computer-readable medium according to claim 15, wherein the program, when executed by the circuitry, further causes the circuitry to:

calculate the evaluation result of the actual structure image based on attribute information of the three-dimensional model.

21. The non-transitory computer-readable medium according to claim 15, wherein the evaluation result of the evaluation item indicates whether an inspection result of the inspection subject is one of pass or fail for the evaluation item.

* * * * *